March 20, 1934. W. C. MARTIN 1,951,554
SHEARS SHARPENING OUTFIT
Filed Oct. 30, 1931
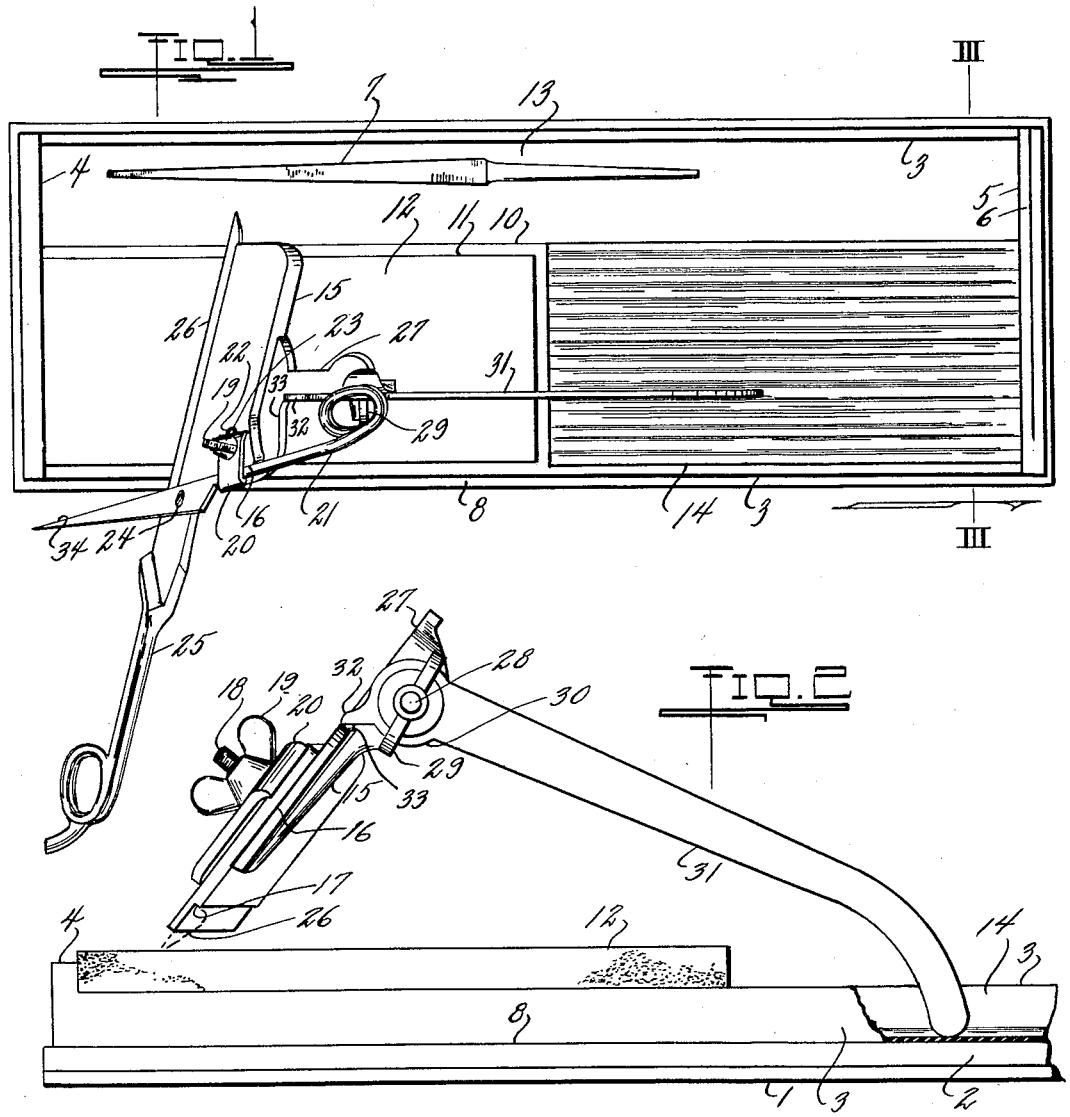
Inventor
William C Martin
By
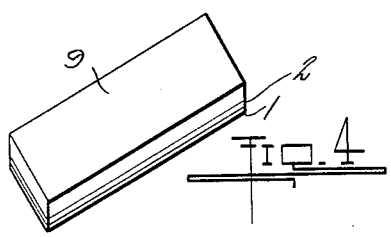
Attorney Patented Mar. 20, 1934

1,951,554

UNITED STATES PATENT OFFICE 1,951,554

SHEARS SHARPENING OUTFIT

William C. Martin, Toledo, Ohio

Application October 30, 1931, Serial No. 572,035

3 Claims. (Cl. 51—158)

This invention relates to handling and directing devices.

This invention has utility when incorporated in sharpening equipment for edged tools, especially barbers' scissors.

Referring to the drawing:

Fig. 1 is a plan view of an embodiment of the invention;

Fig. 2 is a fragmentary side view of the bracket device in working position;

Fig. 3 is a section on the line III—III, Fig. 1; and

Fig. 4 is a perspective view of the complete outfit as used with its cover.

Rubber pad 1 supports base 2 having sides 3 rising therefrom between ends 4, 5. The end 5 is shown provided with ledge 6 upon which may rest the blade of a scissors to be acted upon by file 7 in giving a serrated edge thereto. These portions 3, 4, 5, rising from the base 2 are so disposed as to leave a peripheral ledge 8 upon which may rest slip cover 9 as a housing for the entire outfit.

These sides on the base 2 form an open top box. In this box is minor wall portion 10 which, with a portion of the side 3 and end 4, forms a pocket 11 for stone 12 providing an upper surface for sharpening an edged tool. Laterally from this stone or abrader 12 is clearway portion 13 in which may be located the file 7 as well as the bracket and other elements of the outfit when in out-of-use position. This open top box portion from the base, in its extent beyond the wall 10 toward the end 5, provides a way 14. This way may comprise a series of corrugations serving as guide means toward maintaining a straight line travel in the operation of the device hereunder in producing an edge on scissors.

The device hereunder includes a bracket 15 having a guide 16 along an end portion extending to abutment 17 transversely therefrom. The body of the bracket 15 mounts threaded stem 18 upon which is operable wing nut 19 for adjusting member 20 over the guide 16 and to serve as a clamp for engaging handle portion 21 of a pair of scissors. This clamping member 20 is retained by the nut 19 against angular shifting due to tang 22 from this member 20 entering recess 23 in the bracket 15. In this location of the scissors handle 21, the scissors pivot 24 locates the other handle 25 of the scissors for its blade 26 to ride against the ledge 17. From the body of the bracket 15 there rises extension 27 in which is mounted threaded stem 28 carrying wing nut 29 for acting upon eye 30 of leg 31. This is a ready attaching means so that the leg 31 may be disconnected from the bracket 15 and be in a compact position for packing in the box under the top or cover 9. In the setup position while the leg 31 is adjustable, in practice, a desired angle for location of the leg relatively to the bracket is determined by finger 32 coming into abutting relation with ledge 33. This determines an angle of inclination for the edge of the blade 26 to ride upon the stone 12. In addition to this angle on the vertical, there is the transverse angle due to the direction of the leg 31 as to the ledge 17. This second dimensional angle is maintained by allowing the leg 31 to be located in approximate parallelism with the ribs in the way 14.

With a scissors assembled in the device, the operator may place the pad 1 upon a surface, say of glass or enamel, to which this base will tend to cling due to its adherent properties. The operator may grasp the bracket 15 and cause the blade 26 to move over the stone 12 with the leg 31 away from the operator and moving along backward and forward in a groove of the way 14.

The angularities are such that the normal length barbers' scissors may be handled on a stone relatively narrower than the blade length. It is not necessary for the operator to disconnect the scissors from the clamp to determine blade condition for the handle 25 may be moved on its pivot 24 from the limit-of-swing position against the ledge 17 for the blade 26, away therefrom as the handle 25 moves toward the handle 21, and such operation may even extend to cutting relation with blade 34 in trying out the edged tool. Either of both blades may be assembled for sharpening as may be desired. The assembly is such that a repetition of sharpening operation is along the predetermined angles. The sharpening may recur with a minimum of time and labor for keeping the tools in a high degree of effectiveness.

What is claimed and it is desired to secure by Letters Patent is:

1. A shear sharpening device comprising an abrading surface, a guide way adjacent said surface, shear holding means for guiding one blade of the shears across said abrading surface, said means providing a clamp for the other blade as the engaging means for said shears by the holding means, a ledge provided by said holding means against which the blade to be sharpened may coact when guided across the abrading surface to maintain the angular contact of the blade on the abrading surface, and an extension from said means coacting with said way to maintain the angular contact of said blade across the abrading surface.

2. A shear sharpening device embodying an abrading surface, a corrugated member adjacent said surface providing a plurality of grooves, shear clamping means, and an extension from said clamping means coacting in one of the grooves to guide said shears across the abrading surface to sharpen a portion of one of the shear blades, said extension being shiftable into another of said grooves to complete the sharpening of the blade, said grooves being parallel to thereby retain the same angular sharpening position of the blade as to the abrading surface.

3. A barber scissors sharpener comprising a bracket having a clamp for one member of a scissors pair at the side of the pivot away from the blade, said bracket having spaced away from the clamp abutment means toward and from which the blade of the other member of the scissors pair is freely swingable from closed position to seat against the abutment means at open position for the scissors, said bracket and clamp being clear for normal shearing cooperation of the blades when away from the sharpening receiving position, an abrading member, and a leg from the bracket locating the bracket in directing the blade of the member not clamped by the bracket in position for receiving sharpening action at the abrading means.

WILLIAM C. MARTIN.